United States Patent
Asahara (10) Patent No.: US 10,817,379 B2
(45) Date of Patent: Oct. 27, 2020

(54) INFORMATION PROCESSING APPARATUS, FIRMWARE UPDATE METHOD AND PROGRAM

(71) Applicant: CANON KABUSHIKI KAISHA, Tokyo (JP)

(72) Inventor: Hideo Asahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 15/765,382

(22) PCT Filed: Sep. 28, 2016

(86) PCT No.: PCT/JP2016/004361
§ 371 (c)(1),
(2) Date: Apr. 2, 2018

(87) PCT Pub. No.: WO2017/098678
PCT Pub. Date: Jun. 15, 2017

(65) Prior Publication Data
US 2018/0285091 A1  Oct. 4, 2018

(30) Foreign Application Priority Data
Dec. 8, 2015  (JP) ................................ 2015-239748

(51) Int. Cl.
*G06F 11/14* (2006.01)
*G06F 8/65* (2018.01)

(52) U.S. Cl.
CPC ............ *G06F 11/1433* (2013.01); *G06F 8/65* (2013.01); *G06F 11/1469* (2013.01); *G06F 2201/82* (2013.01)

(58) Field of Classification Search
CPC ..... G06F 8/65; G06F 11/1469; G06F 2201/82
See application file for complete search history.

(56) References Cited

U.S. PATENT DOCUMENTS

| | | | |
|---|---|---|---|
| 2003/0025811 A1* | 2/2003 | Keelan | G06F 8/60 348/239 |
| 2003/0131083 A1 | 7/2003 | Inui et al. | |

(Continued)

FOREIGN PATENT DOCUMENTS

| | | |
|---|---|---|
| JP | 2012118869 A | 6/2012 |
| JP | 2012-220963 A | 11/2012 |

(Continued)

OTHER PUBLICATIONS

Japanese Office Action issued in corresponding Japanese Application No. 2015239749 dated May 24, 2019.

(Continued)

*Primary Examiner* — Paul Contino
(74) *Attorney, Agent, or Firm* — Venable LLP (57) ABSTRACT

An information processing apparatus which is provided with firmware, comprises: obtaining means for obtaining a data set of firmware; update means for performing firmware update using the data set of the firmware obtained by the obtaining means; and applying means for applying customized data indicating a setting value for a function of the firmware to the firmware provided in the information processing apparatus, wherein in a case where customized data is included in the data set of the firmware obtained by the obtaining means, the applying means applies the customized data.

11 Claims, 10 Drawing Sheets

(56) References Cited

U.S. PATENT DOCUMENTS

| | | | |
|---|---|---|---|
| 2004/0025002 A1* | 2/2004 | Cepulis | G06F 11/1417 |
| | | | 713/2 |
| 2007/0252724 A1* | 11/2007 | Donaghey | G01D 4/004 |
| | | | 340/905 |
| 2010/0083241 A1 | 4/2010 | Kobayashi | |
| 2013/0159991 A1 | 6/2013 | Sato | |
| 2014/0047432 A1 | 2/2014 | Michishita | |
| 2014/0325203 A1* | 10/2014 | Roche | G06F 9/4401 |
| | | | 713/2 |
| 2014/0344800 A1* | 11/2014 | Ohs | H04L 12/2814 |
| | | | 717/171 |
| 2015/0067671 A1 | 3/2015 | Kamiya | |
| 2015/0074386 A1* | 3/2015 | Huang | G06F 9/4401 |
| | | | 713/2 |

FOREIGN PATENT DOCUMENTS

| | | |
|---|---|---|
| JP | 5141134 B | 2/2013 |
| JP | 2013-130923 A | 7/2013 |
| JP | 2014-035752 A | 2/2014 |
| JP | 2015141697 A | 8/2015 |

OTHER PUBLICATIONS

Written Opinion and International Search Report issued in corresponding parent International Application No. PCT/JP2016/004361 dated Nov. 22, 2016.

* cited by examiner

```
<?xml version = "1.0" encoding= "UTF-8?">
<customized data>
  <custom switch>
    <identifier> setting B </identifier>
    <setting value> 1 </setting value>
  </custom switch>
</customized data>
```
~303

[Fig. 5]

```
<?xml version="1.0" encoding="UTF-8"?>
<firmware set>
 <firmware list>
  <firmware>
   <name> firmware 1 </name>
   <version> 1.1 </version>
   </firmware>
   <firmware>
   <name> firmware 2 </name>
   <version> 1.0 </version>
  </firmware>
  <firmware>
   <name> firmware 3 </name>
   <version> 1.0 </version>
  </firmware>
  <firmware>
   <name> customized data </name>
   <version> 1.1 </version>
  </firmware>
 </firmware list>
</firmware set>
```
~304

INFORMATION PROCESSING APPARATUS, FIRMWARE UPDATE METHOD AND PROGRAM

TECHNICAL FIELD

The present invention relates to an information processing apparatus, a firmware update method and a program.

BACKGROUND ART

There are cases where a business-dedicated function that is exclusively customized is provided in order to meet customers' individual demands when selling multi-function devices. In this case, individually developing business firmware is costly, and thus generally, a business-dedicated function is implemented in product firmware in advance, and a custom switch that enables switching between activation/deactivation of the function is provided.

However, manually activating a custom switch and installing the custom switch at a customer site is troublesome and has the possibility that mistakes are made. Therefore, customized data for activating an appropriate custom switch is generated in accordance with individual businesses, and the customized data is imported.

However, if the combination of product firmware and customized data is wrong, there is an issue of the occurrence of a problem in that functions in the product firmware cannot be appropriately activated. This is because customized data needs to be generated in accordance with the version of the specific product firmware. Japanese Patent No. 5141134 discloses a technique for migrating so as to be able to handle settings stored in a device at the time of updating firmware even with new firmware, but the values of the custom switch cannot be changed.

SUMMARY OF INVENTION

In light of the above problems, the present invention provides a mechanism in accordance with which customized data that is correctly combined with firmware is automatically applied without manual intervention.

According to one aspect of the present invention, there is provided an information processing apparatus which is provided with firmware, comprising: obtaining means for obtaining a data set of firmware; update means for performing firmware update using the data set of the firmware obtained by the obtaining means; and applying means for applying customized data indicating a setting value for a function of the firmware to the firmware provided in the information processing apparatus, wherein in a case where customized data is included in the data set of the firmware obtained by the obtaining means, the applying means applies the customized data.

According to another aspect of the present invention, there is provided a firmware update method for an information processing apparatus which is provided with firmware, the method comprising: obtaining a data set of firmware; performing firmware update using the obtained data set of the firmware; and applying customized data indicating a setting value for a function of the firmware to the firmware provided in the information processing apparatus, wherein in a case where customized data is included in the obtained data set of the firmware, the customized data is applied.

According to another aspect of the present invention, there is provided a program for causing a computer to function as: obtaining means for obtaining a data set of firmware; update means for performing firmware update using the data set of the firmware obtained by the obtaining means; and applying means for applying customized data indicating a setting value for a function of the firmware to the firmware provided in the computer, wherein in a case where customized data is included in the data set of the firmware obtained by the obtaining means, the applying means applies the customized data.

According to another aspect of the present invention, there is provided an information processing apparatus which is provided with firmware, comprising: obtaining means for obtaining, from an external apparatus, a data set which includes firmware and customized data indicating a setting value for a function of the firmware; update means for performing firmware update using the firmware included in the data set obtained by the obtaining means; and applying means for applying the customized data indicating the setting value for the function of the firmware included in the data set obtained by the obtaining means to the firmware provided in the information processing apparatus.

According to another aspect of the present invention, there is provided a firmware update method in an information processing apparatus which is provided with firmware, the method comprising: obtaining, from an external apparatus, a data set which includes firmware and customized data indicating a setting value for a function of the firmware; performing firmware update using the firmware included in the obtained data set; and applying the customized data indicating the setting value for the function of the firmware included in the obtained data set to the firmware provided in the information processing apparatus.

According to another aspect of the present invention, there is provided a program for causing a computer to function as: obtaining means for obtaining, from an external apparatus, a data set which includes firmware and customized data indicating a setting value for a function of the firmware; update means for performing firmware update using the firmware included in the data set obtained by the obtaining means; and applying means for applying the customized data indicating the setting value for the function of the firmware included in the data set obtained by the obtaining means to firmware provided in the computer.

According to the present invention, at the time of updating firmware, customized data that is correctly combined with the firmware is automatically applied without manual intervention, and thereby combination errors and the like do not occur.

Further features of the present invention will become apparent from the following description of exemplary embodiments (with reference to the attached drawings).

DESCRIPTION OF EMBODIMENTS

A mode for implementing the present invention will be described below with reference to the drawings. Note that in the following description, an image forming apparatus such as an MFP will be described as an example of an information processing apparatus according to the present invention, but the present invention is not limited thereto, and other apparatuses may be used as long as the apparatuses are information processing apparatuses provided with firmware.

First Embodiment

System Configuration

Figure 1:
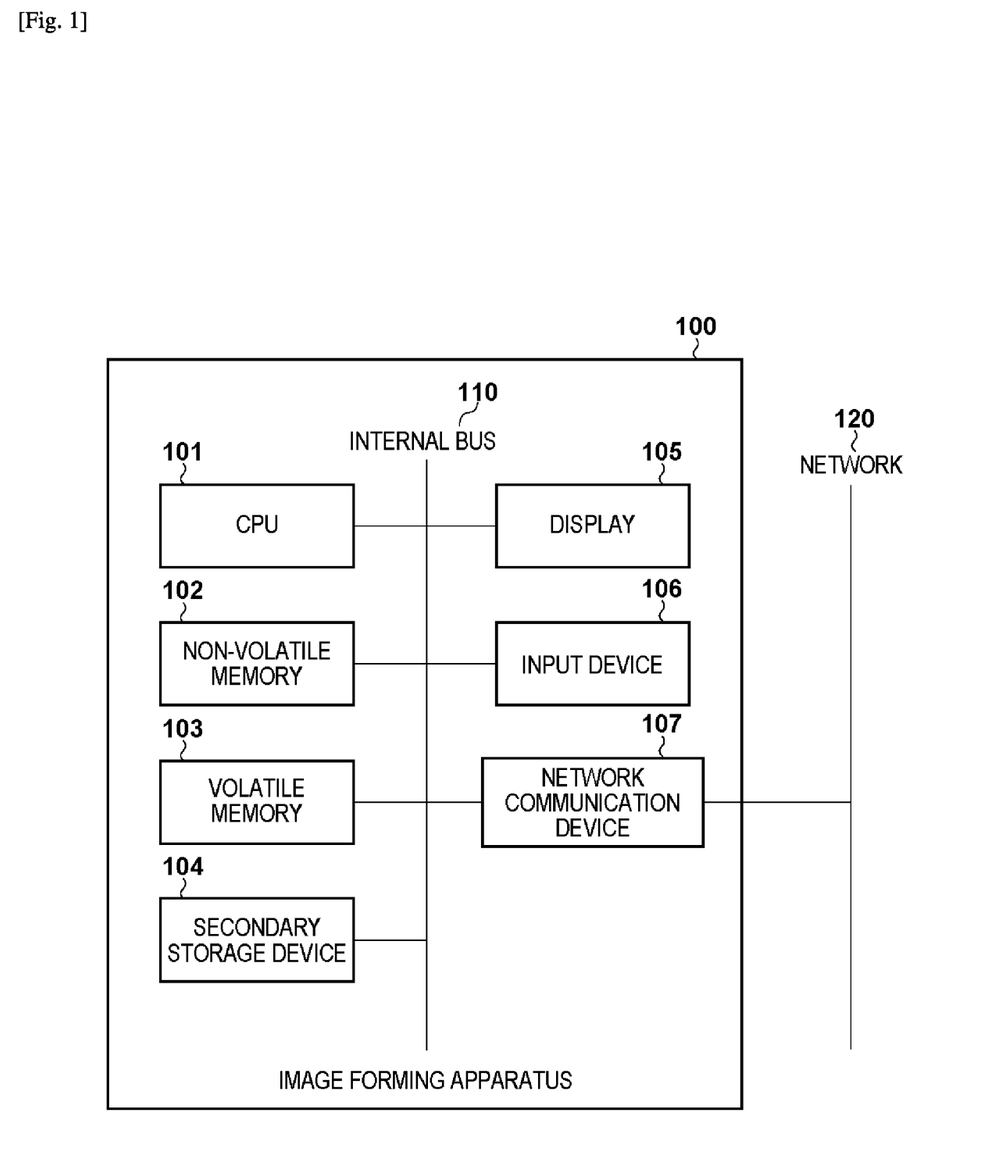
FIG. 1 is a diagram showing a configuration example of hardware of an image forming apparatus according to the present invention.

FIG. 1 is a diagram showing an example of a hardware configuration of an image forming apparatus 100 according to this embodiment. The image forming apparatus 100 is an apparatus having a function of forming images, which is represented by a multi-function device such as an MFP (Multi-Function Peripheral). The image forming apparatus 100 is provided with a CPU 101, a non-volatile memory 102, a volatile memory 103, a secondary storage device 104, a display 105, an input device 106 and a network communication device 107. Each of the constituent elements is connected via an internal bus 110, which is a communication bus, so as to enable mutual communication within the image forming apparatus 100.

The CPU 101 executes programs and controls various types of processing. The non-volatile memory 102 is constituted by a ROM (Read Only Memory), and stores programs and data that are necessary at an initial stage of device start processing. The volatile memory 103 is constituted by a RAM (Random Access Memory), and is used as a location for temporarily storing programs and data. The secondary storage device 104 is constituted by a large capacity storage device such as a hard disk or a RAM drive, and saves a large volume of data, holds program execution codes, and holds setting values of the image forming apparatus 100. The secondary storage device 104 stores data required to be held for a long time, in comparison with the volatile memory 103. The secondary storage device 104 is a nonvolatile storage device, and thus is able to continuously store data even if the image forming apparatus 100 is turned off.

The display 105 is a display device for displaying various types of information. The input device 106 is a device for accepting user instructions and transmitting the user instructions to programs via the internal bus 110. The network communication device 107 allows the image forming apparatus 100 to communicate with an external information device via a network 120.

Figure 2:
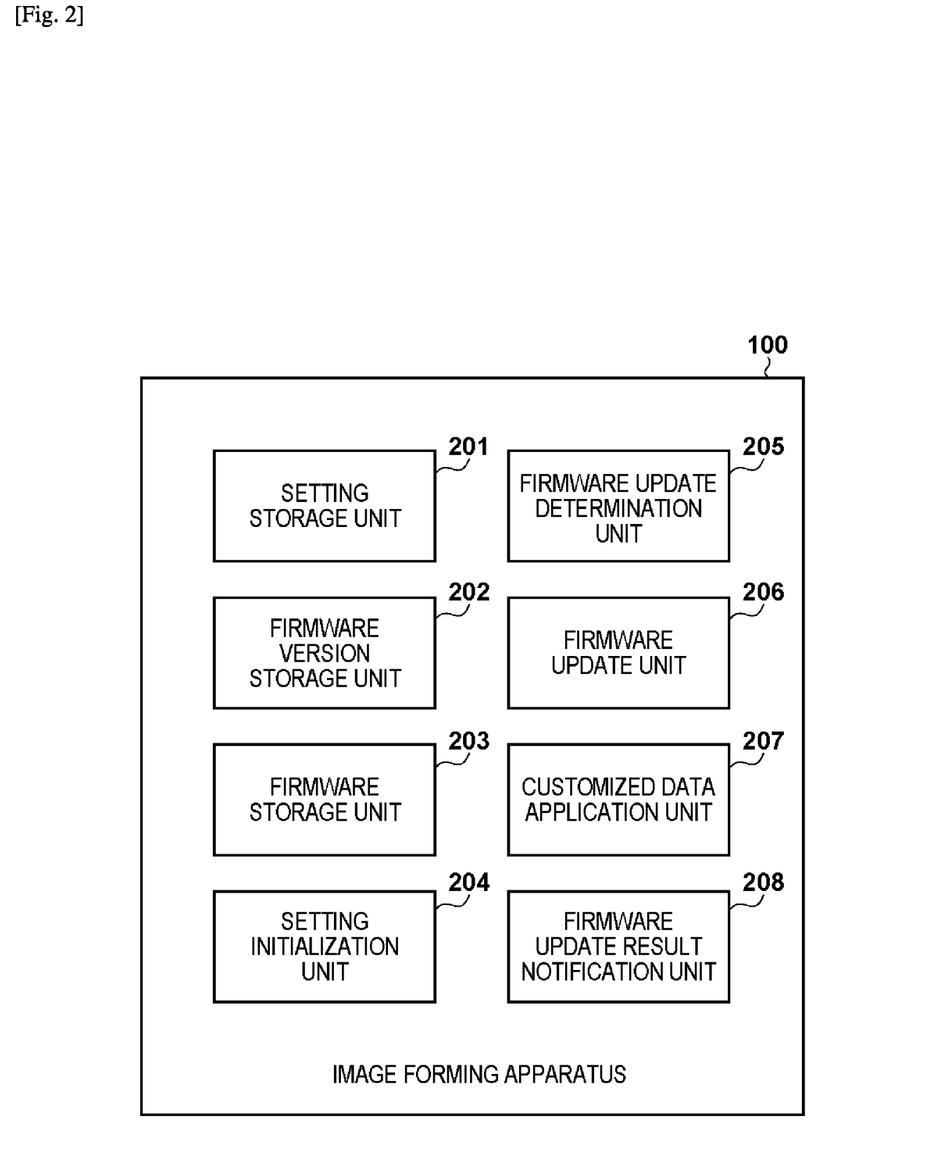
FIG. 2 is a diagram showing a configuration example of software of an image forming apparatus according to a first embodiment.

FIG. 2 is a diagram showing an example of a software configuration of the image forming apparatus 100 according to this embodiment. In the image forming apparatus 100, each piece of software shown in FIG. 2 is saved in the non-volatile memory 102 or the secondary storage device 104, and is executed by the CPU 101. Also, in the image forming apparatus 100, various types of information used at the time of execution are held in the volatile memory 103 or the secondary storage device 104, and are exchanged between pieces of software.

The software according to this embodiment is constituted by including a setting storage unit 201, a firmware version storage unit 202, a firmware storage unit 203, a setting initialization unit 204, a firmware update determination unit 205, a firmware update unit 206, a customized data application unit 207 and a firmware update result notification unit 208.

The setting storage unit 201 stores, in the secondary storage device 104, a setting for switching the behavior of each function of the image forming apparatus 100. The setting list shown in Table 1 below indicates examples of setting values that are stored by the setting storage unit 201.

TABLE 1

| Setting value identifier | Setting value |
|---|---|
| setting A | 0 |
| setting B | 0 |

In the example shown in Table 1, a state is indicated in which there are two setting items, namely, setting A and setting B, and both the values are 0. Specific examples of settings include a setting for activating a function of displaying a company name and a logo on a default screen, a setting for disabling use of a transmission function, a setting for disabling transmission to destinations other than those registered in an address book, and the like. Those functions are not necessarily convenient depending on customers, and thus control is performed so as to activate/deactivate the functions provided in the image forming apparatus 100 in accordance with customer demands. Note that the number of setting items is not limited thereto, and more setting items may be further included. Also, the above-described setting items may include a setting for any function among a plurality of functions included in one piece of firmware, or may include a setting for a function that is shared by a plurality of pieces of firmware.

The firmware version storage unit 202 stores, in the secondary storage device 104, the versions of firmware pieces that are being operated in the image forming apparatus 100. The firmware version list shown in Table 2 below indicates examples of firmware versions that are stored by the firmware version storage unit 202.

TABLE 2

| Name of firmware | Version |
|---|---|
| Firmware 1 | 1.0 |
| Firmware 2 | 1.0 |
| Firmware 3 | 1.0 |
| Customized data | 1.0 |

In the example shown in Table 2, a state is indicated in which there are four pieces of firmware in total consisting of three pieces of firmware, namely, firmware 1, firmware 2 and firmware 3, and firmware for holding customized data, and the versions of the firmware are all 1.0. Specific examples of firmware include firmware for a printer engine, firmware for a scanner engine, firmware for a finisher and the like. Note that the number of pieces of firmware and types of firmware are not limited thereto, and there may be more detailed classification.

The firmware storage unit 203 stores, in the secondary storage device 104, firmware that operates in the image forming apparatus 100.

The setting initialization unit 204 initializes setting values stored in the setting storage unit 201 of the image forming apparatus 100. Basic initial values are held by the firmware stored in the firmware storage unit 203. The setting initialization unit 204 returns each of the setting values to a basic initial value, and then determines whether or not customized data is included in the firmware stored in the firmware storage unit 203. The determination here is performed based on whether or not, in a firmware list stored in the firmware version storage unit 202, firmware whose firmware name is "customized data" is included and an active version is stored. Note that a determination method may be a method for directly searching for firmware stored in the firmware storage unit 203. In the case where customized data is included, the customized data application unit 207 is requested to apply the customized data. Accordingly, processing for initializing setting values to initial values on which customized data is reflected is performed.

The firmware update determination unit 205 receives a firmware update request, and determines firmware to be updated. For example, the firmware update request may be made by the user operating the input device 106, or may be made from another information device via the network communication device 107.

Figure 3:
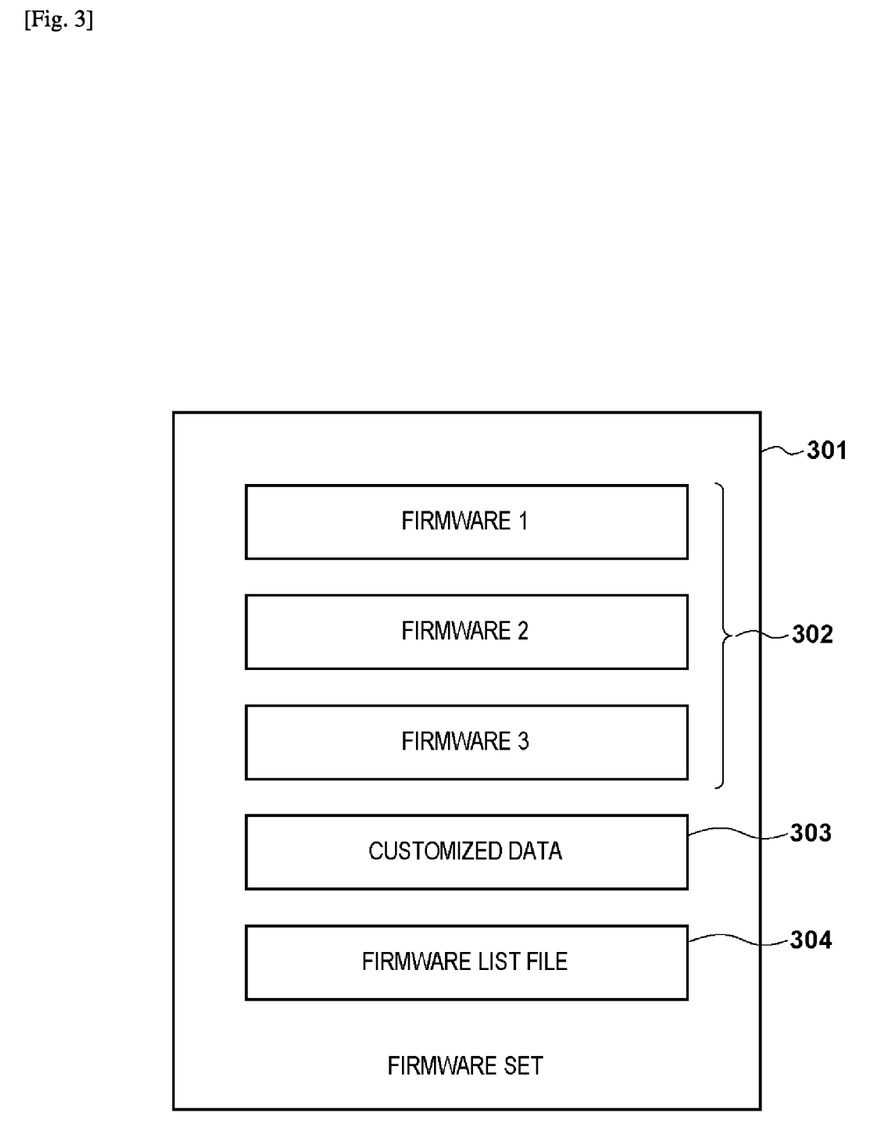
FIG. 3 is a diagram showing a configuration example of a firmware set according to the present invention.

FIG. 3 shows an example of a data configuration of firmware used for update. A firmware set 301 is a data set in which individual pieces of firmware and information files are put together. In the example in FIG. 3, there are four pieces of firmware in total, namely, a firmware file 302 (three pieces of firmware, namely, the firmware 1, 2 and 3), and firmware named customized data 303. Furthermore, the firmware set 301 includes a firmware list file 304 indicating the information regarding the firmware set 301. The firmware 1, the firmware 2 and the firmware 3 are actually software programs having a format that allows execution by the CPU 101, for example. As described above, the customized data 303 included in the firmware set 301 is also handled as a type of firmware.

Figure 4:
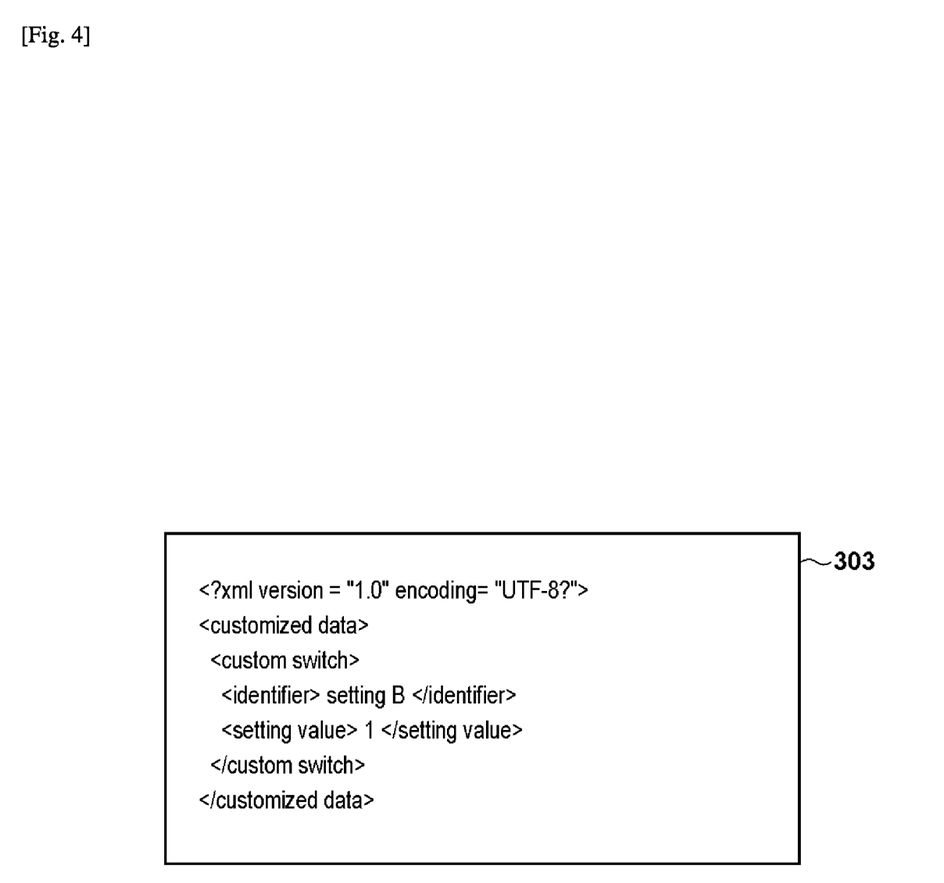
FIG. 4 is a diagram showing a description example of customized data.

FIG. 4 shows a description example of the customized data 303. In the example in FIG. 4, data is written in an XML (Extensible Markup Language) file, and an identifier and a setting value of a setting that has been customized are held. Here, customized data for changing the value of the setting B to "1" is shown. Specific examples of the customized data 303 include an XML file that includes a setting for activating a function of displaying a company name and a logo on a default screen, and the like. There may be a plurality of custom switches, and a more complicated condition may be added. Note that here, an XML format file is used as an example, but the present invention is not limited to this format.

Figure 5:
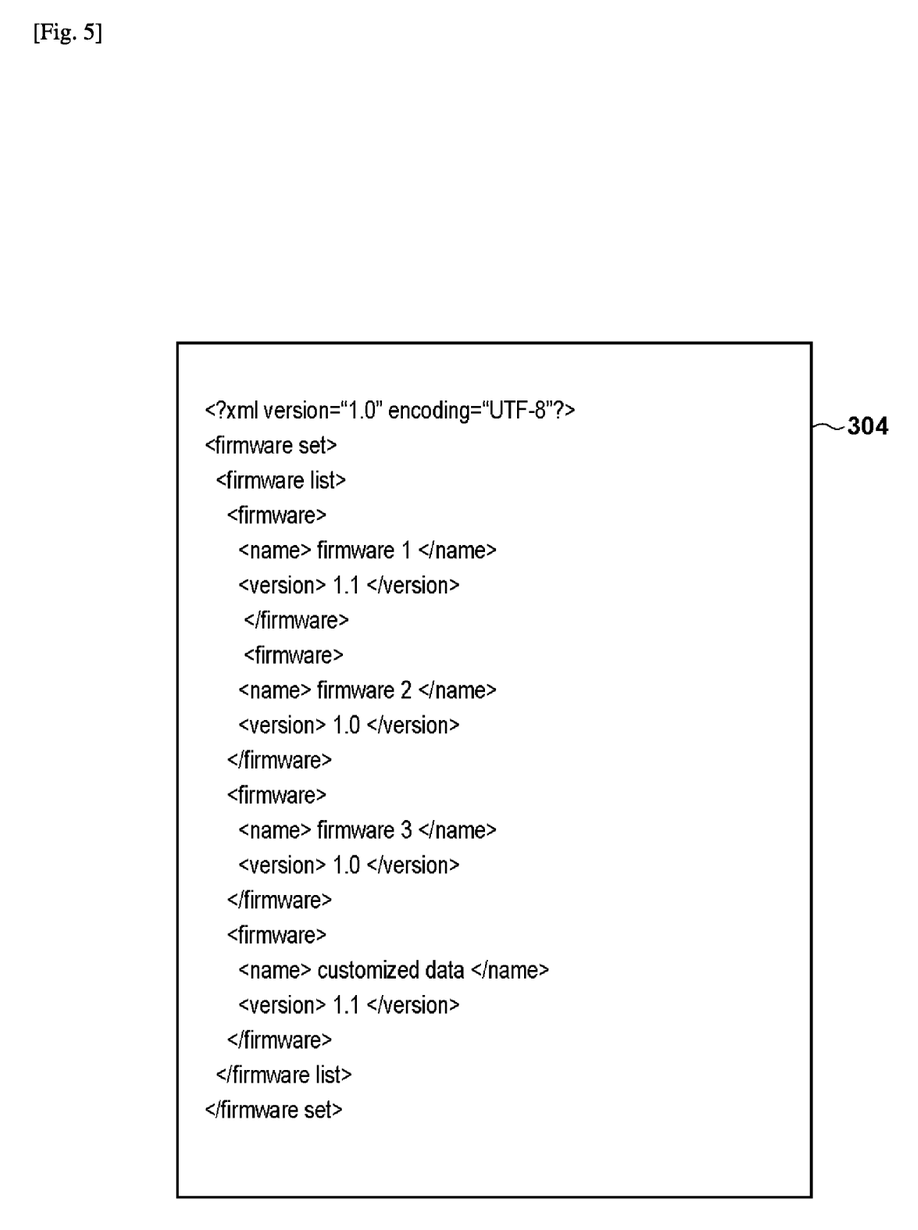
FIG. 5 is a diagram showing a description example of a firmware list file.

FIG. 5 shows a description example of the firmware list file 304. In the example in FIG. 5, data is written in an XML file, and a list of firmware included in the firmware set 301 is held therein. In the firmware list file 304, the name and the version of each firmware are held. For example, the version of the firmware 1 is "1.1". Firmware information written in the firmware list file 304 needs to match the firmware included in the firmware set 301, or at least have an inclusion relation with the firmware included in the firmware set 301. Regarding information on each firmware, it is necessary to hold at least two pieces of information, namely, information that indicates whether the firmware is new or old, and information that makes it possible to identify the firmware.

Note that in addition to the above information, there may be a hash value for checking or file size information.

The firmware update determination unit 205 compares the version of each firmware stored in the firmware version storage unit 202 to the version of the firmware saved in the firmware list file 304, and determines whether or not the firmware needs to be updated. For example, assume that the version of the firmware 1 is "1.0" as indicated in Table 2, and the version of the firmware 1 included in the firmware set 301 is "1.1" as shown in FIG. 5. At this time, the firmware update determination unit 205 detects that the version has been upgraded, and determines that the firmware 1 needs to be updated. Also, assume that the version of the firmware 2 is "1.0" as indicated in Table 2, and the version of the firmware 2 included in the firmware set 301 is "1.0" as indicated in FIG. 5. At this time, the firmware update determination unit 205 detects that the version has not been changed, and determines that the firmware 2 does not need to be updated.

The firmware update unit 206 obtains the data file of the firmware determined by the firmware update determination unit 205 to be in need of updating, and performs processing for updating the firmware. The firmware is stored in the firmware storage unit 203, and the firmware update unit 206 overwrites and updates this firmware.

The customized data application unit 207 applies a custom switch held by the customized data 303 to a setting value stored in the setting storage unit 201. For example, in the case where the customized data 303 shown in FIG. 4 is applied to the image forming apparatus 100 that is in a state of holding the setting values shown in Table 1, the setting value of the setting B is changed from "0" to "1".

Figure 6A:
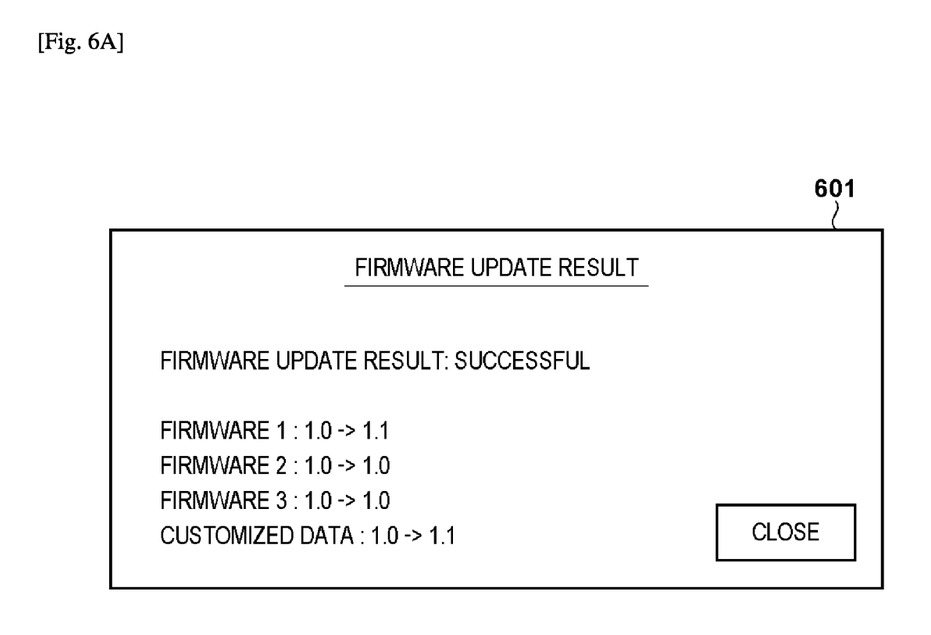
FIG. 6A is a diagram showing an example of a firmware update result screen.
Figure 6B:
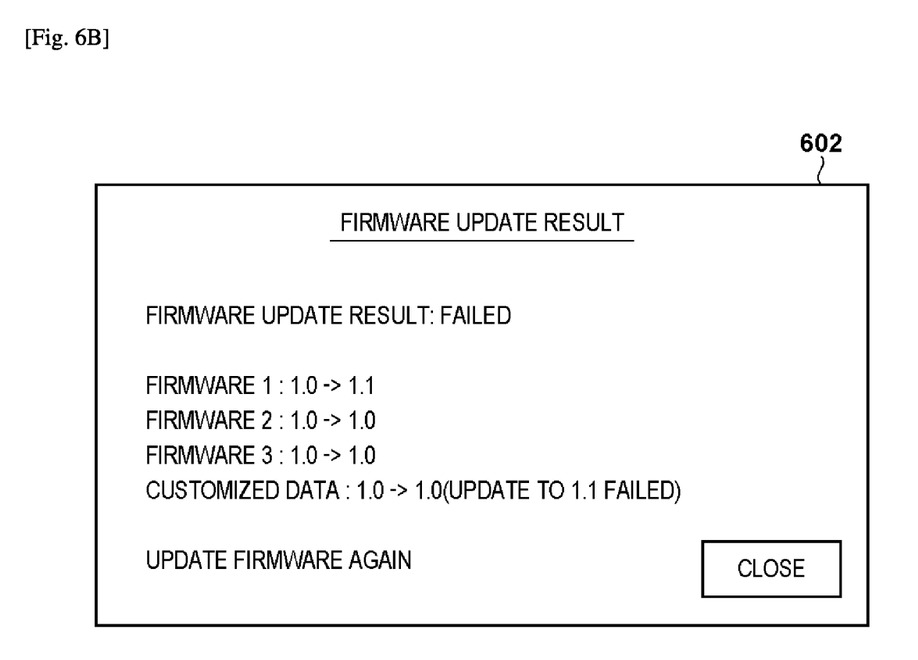
FIG. 6B is a diagram showing an example of a firmware update result screen.

The firmware update result notification unit 208 notifies the requester of a firmware update result. In the case where the user requests firmware update from the input device 106, the firmware update result notification unit 208 notifies the result by displaying a result screen on the display 105. FIG. 6A shows an example of a result notification screen 601 when firmware update was successful. In the result notification screen 601, the versions of each piece of firmware before and after being updated are displayed. FIG. 6B shows an example of a result notification screen 602 when firmware update failed. The result notification screen 602 indicates that application of the customized data 303 failed, and that the version has not been upgraded.

The screens that are displayed on the display 105 were described here as examples, but other modes may be adopted. For example, a configuration may be adopted in which if a firmware update request was made via the network 120, a result screen is displayed on the information terminal that made the request. Moreover, contents to be notified may be more detailed. For example, the reason why application of the customized data 303 failed may be displayed. As examples of the reason for the failure, cases such as where a job that depends on the customized data 303 is being executed, and where the customized data 303 itself is damaged are envisioned.

Processing Flow

Firmware Update Processing

Figure 7:
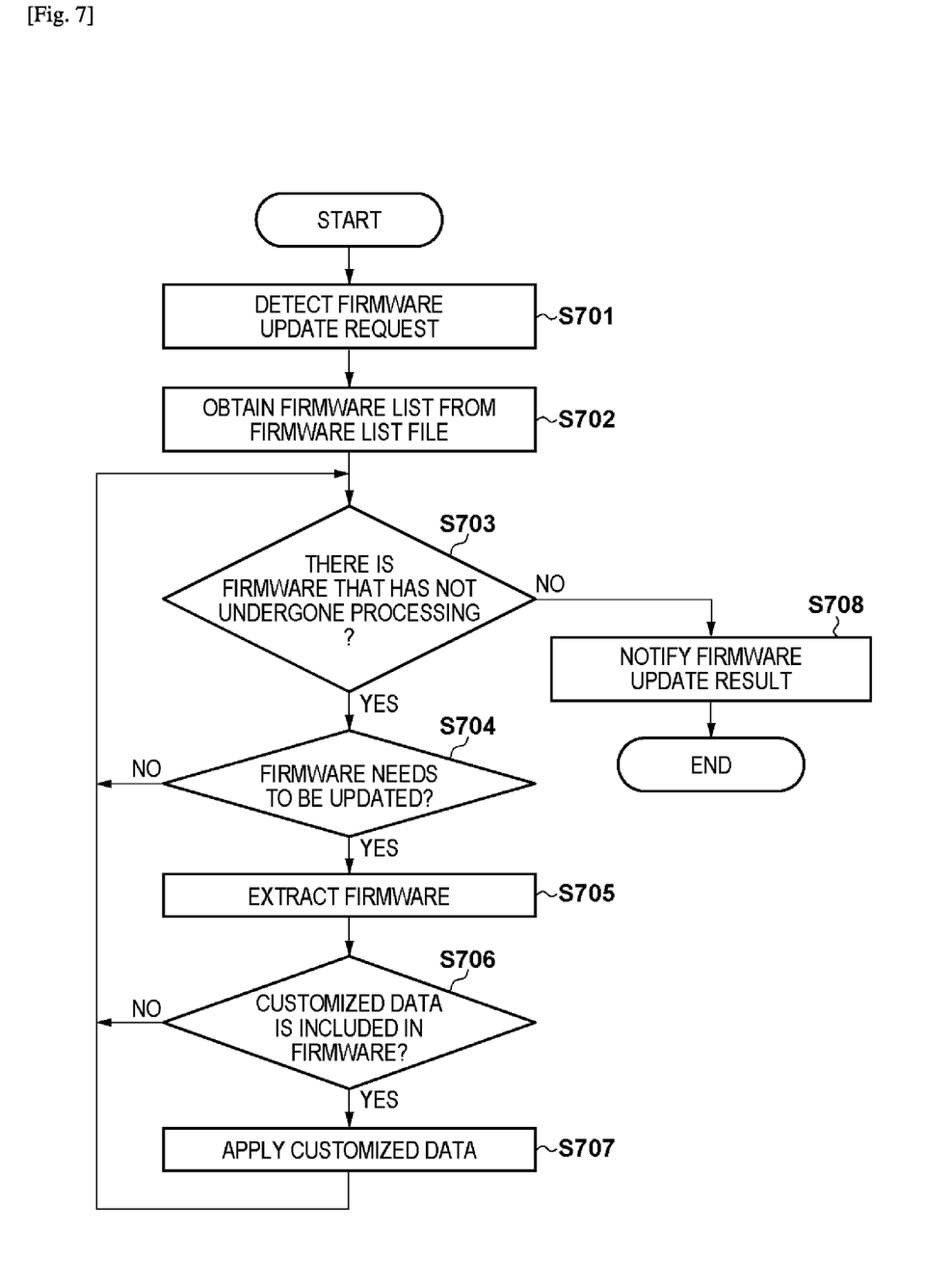
FIG. 7 is a flowchart for updating firmware according to the first embodiment.

FIG. 7 is a flowchart illustrating the flow of firmware update of the image forming apparatus 100 according to this embodiment. This processing is realized by the CPU 101 of the image forming apparatus 100 reading a program stored in the secondary storage device 104 or the like and executing the program, which thereby operates as a portion of each of the above-described pieces of software.

In step S701, the firmware update determination unit 205 detects a firmware update request.

In step S702, the firmware update determination unit 205 reads the firmware list file 304 that is included in the firmware set 301 to be updated, and obtains a firmware list.

In step S703, the firmware update determination unit 205 determines whether or not there is, in the firmware list obtained in step S702, firmware that has not undergone the processing of step S704 onward. In the case where there is firmware that has not undergone the processing (step S703: YES), the procedure advances to step S704, and in the case where there is no firmware that has not undergone the processing (step S703: NO), the procedure advances to step S708.

In step S704, the firmware update determination unit 205 determines whether or not it is necessary to update the firmware to be processed. The determination here is performed by comparing the firmware versions stored in the firmware version storage unit 202 to the versions of the firmware written in the firmware list obtained in step S702. Here, a case in which it is attempted to update firmware on the firmware list in FIG. 5 for the image forming apparatus 100 that is in the state of Table 2 will be described as an example. It is determined that the firmware 1 and customized data, whose versions are to be upgraded from a version "1.0" to a version "1.1", need to be updated. However, it is determined that the firmware 2 and 3 do not need to be updated, since the versions of the firmware 2 and 3 before and after being updated are the same, namely "1.0". In the case where it is determined that the firmware needs to be updated (step S704: YES), the procedure advances to step S705, and in the case where it is determined that the firmware does not need to be updated (step S704: NO), the procedure returns to step S703.

In step S705, the firmware update unit 206 updates the firmware. The firmware update unit 206 replaces the firmware stored in the firmware storage unit 203 with new firmware using the firmware set 301, and updates the firmware version stored in the firmware version storage unit 202. In the case where firmware on the firmware list in FIG. 5 is updated for the image forming apparatus 100 that is in the state of Table 2, information stored in the firmware version storage unit 202 becomes as indicated in Table 3 below.

TABLE 3

| Name of firmware | Version |
| --- | --- |
| Firmware 1 | 1.1 |
| Firmware 2 | 1.0 |
| Firmware 3 | 1.0 |
| Customized data | 1.1 |

In step S706, the customized data application unit 207 determines whether or not the firmware extracted in step S705 includes the customized data 303. In the case where the customized data 303 is included (step S706: YES), the procedure advances to step S707, and in the case where the customized data 303 is not included (step S706: NO), the procedure returns to step S703.

In step S707, the customized data application unit 207 applies the customized data 303. Here, a case in which the customized data 303 shown in FIG. 4 is applied to the image forming apparatus 100 that is in the state of Table 1 will be described as an example. Customization for setting a setting value "1" to the setting B is written in the customized data 303. When the customized data 303 is applied, settings stored in the setting storage unit 201 become as indicated in Table 4 below.

TABLE 4

| Setting value identifier | Setting value |
| --- | --- |
| setting A | 0 |
| setting B | 1 |

In step S708, the firmware update result notification unit 208 notifies a firmware update result. In the case where it is attempted to update the firmware on the firmware list file 304 shown in FIG. 5 for the image forming apparatus 100 that is in the state in Table 2, a result as described with reference to FIG. 6A or 6B is displayed.

Initialization Processing

Figure 8:
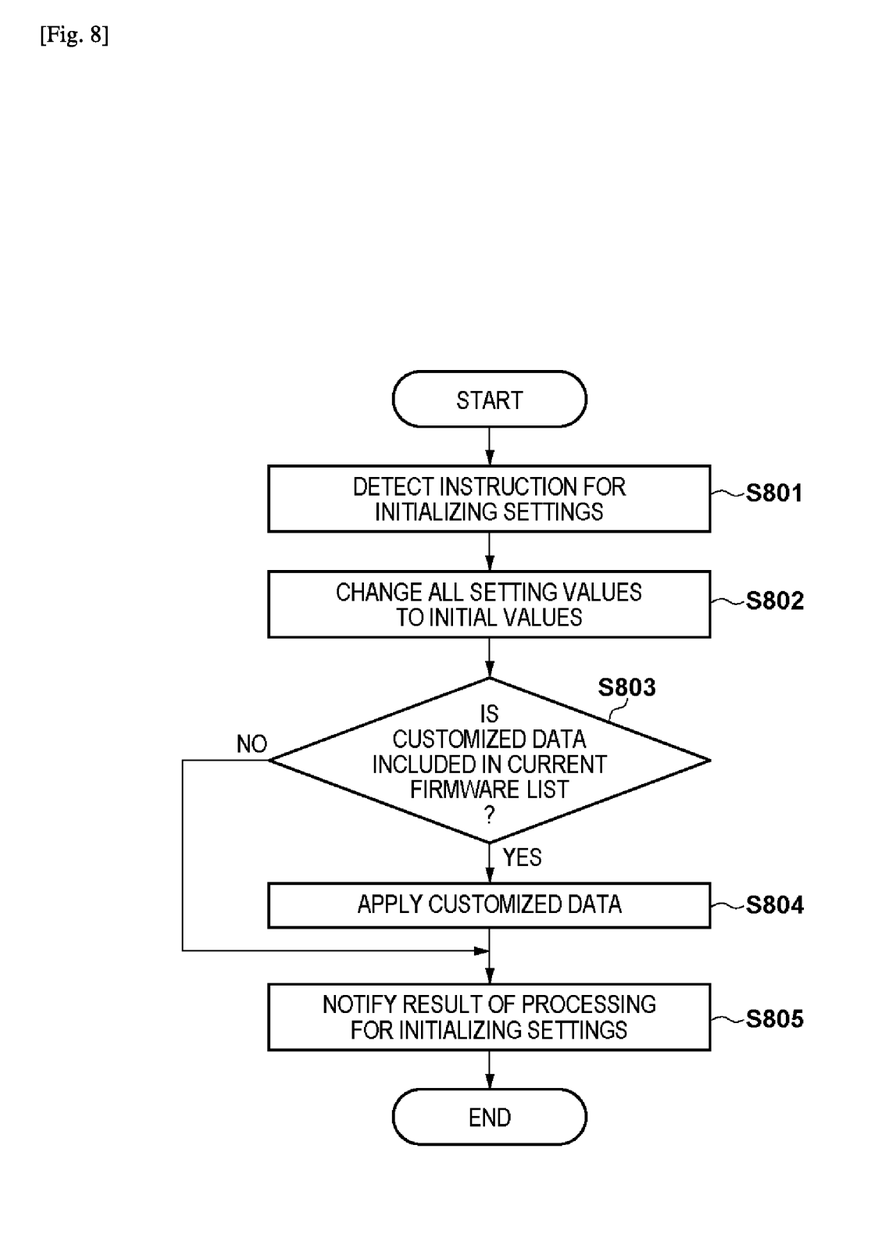
FIG. 8 is a flowchart for initializing setting values according to the present invention.

FIG. 8 is a flowchart illustrating the flow of processing for initializing setting values of the image forming apparatus 100. This processing is realized by the CPU 101 of the image forming apparatus 100 reading a program stored in the secondary storage device 104 or the like and executing the program, which thereby operates as a portion of each of the above-described pieces of software.

In step S801, the setting initialization unit 204 detects an instruction for initializing the settings.

In step S802, the setting initialization unit 204 applies initial values held by firmware stored in the firmware storage unit 203, and changes setting values stored in the setting storage unit 201 to the initial values. For example, a case in which the values indicated in Table 1 are initial values, and this step is executed for the image forming apparatus 100 that is in the state of Table 4 will be described as an example. Before initialization, the value of the setting A is "0", and the value of the setting B is "1". However, the value of the setting B is changed to "0" as shown in Table 1 due to the processing of this step.

In step S803, the setting initialization unit 204 determines whether or not customized data is included in the current firmware list. Taking Table 2 as an example, there is customized data whose firmware version is "1.0", and thus it is determined that customized data is included. In the case where it is determined that customized data is included (step S803: YES), the procedure advances to step S804, and in the case where it is determined that customized data is not included (step S803: NO), the procedure advances to step S805.

In step S804, the customized data application unit 207 applies the customized data to the image forming apparatus 100. A case in which the customized data 303 shown in FIG. 4 is applied to the image forming apparatus 100 that is in the state described in the description of step S802 will be described as an example. Due to step S802, the value of the setting A has become "0", and the value of the setting B has become "0". However, the customized data 303 in FIG. 4 is stored such that the value of the setting B is to be set to "1", and thus as a result of the processing of this step, the value of the setting A remains to be "0", and the value of the setting B is set to "1". In other words, after the initialization processing, the customized data application unit 207 once again applies the customized data that was applied before the initialization processing.

In step S805, the setting initialization unit 204 notifies the result of the processing for initializing the settings. Note that although a result screen is not illustrated here, the user who instructed initialization is notified that the initialization is completed.

As described above, in this embodiment, the customized data application unit 207 used at the time of updating firmware of an image forming apparatus is provided so as to apply customized data if the customized data has been updated. This makes it possible to activate necessary customization settings without a user operation.

Moreover, in this embodiment, even if the initialization processing is performed, the setting of the custom switch that is controlled by the customized data is not lost, due to the processing shown in FIG. 8.

Moreover, in the above-described example, an example was described in which the firmware 1 and customized data from a firmware set have been updated, but even in the case of updating customized data only, the processing shown in FIG. 7 can be applied. In other words, the above processing makes it possible to update customized data only, and to reflect the contents of the customized data.

Second Embodiment

Next, a second embodiment for implementing the present invention will be described. The second embodiment is an embodiment that envisions an environment in which customized data cannot be applied at the time of firmware update. There are cases where a start mode for firmware update that is different from a normal start mode is prepared as a method for updating firmware in a built-in apparatus. In such a start mode for firmware update, programs that can be operated are generally restricted, and thus a case in which a program necessary for applying customized data cannot be operated is envisioned. Even in such a situation, the present invention can be realized by switching start modes.

System Configuration

Figure 9:
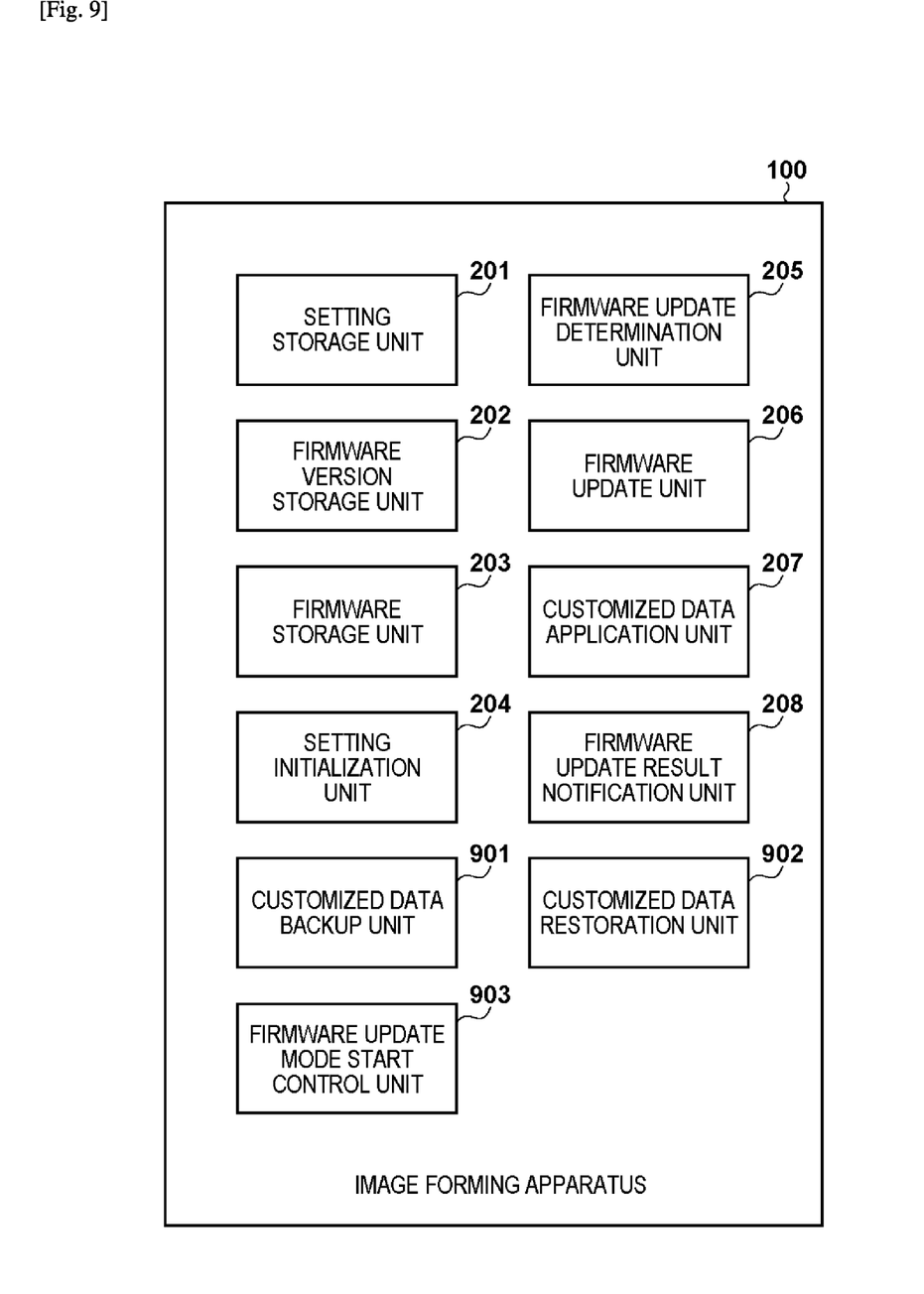
FIG. 9 is a diagram showing an example of a software configuration according to a second embodiment.

FIG. 9 is a diagram showing a configuration example of software according to this embodiment. Note that the same reference numerals are given to constituent elements that overlap those of the first embodiment, and detailed description thereof is omitted.

The image forming apparatus 100 according to this embodiment is constituted by including, in addition to the constitute elements shown in FIG. 2, a customized data backup unit 901, a customized data restoration unit 902, and a firmware update mode start control unit 903.

The customized data backup unit 901 performs processing for backing up customized data among firmware stored in the firmware storage unit 203 and saving the customized data at another location. Here, for example, a storage region of the secondary storage device 104 and the like correspond to the storage location. The customized data backup unit 901 also saves the firmware version of the customized data stored in the firmware version storage unit 202.

The customized data restoration unit 902 performs processing for replacing the customized data stored in the firmware storage unit 203 with the customized data backed up by the customized data backup unit 901. At the same time, the customized data restoration unit 902 also performs processing for replacing the firmware version of the customized data stored in the firmware version storage unit 202 (with the firmware version of the customized data backed up by the customized data backup unit 901).

In this embodiment, the timing of extracting firmware and the timing of applying customized data are different, and thus it is necessary to consider recovery processing when application of customized data fails. In view of this, the customized data backup unit 901 and the customized data restoration unit 902 perform processing for returning customized data firmware to the original state.

The firmware update mode start control unit 903 performs switching to a dedicated start mode for firmware update. The dedicated start mode for firmware update is a mode for operating only minimum firmware required for execution of processing related to firmware update by the firmware update unit 206. It is accordingly intended to prevent occurrence of a failure caused by changing a program that is being operated. The dedicated start mode for firmware update is expressed as a "firmware update mode". Also, the normal start mode is referred to in comparison with the firmware update mode.

Processing Flow

Figure 10:
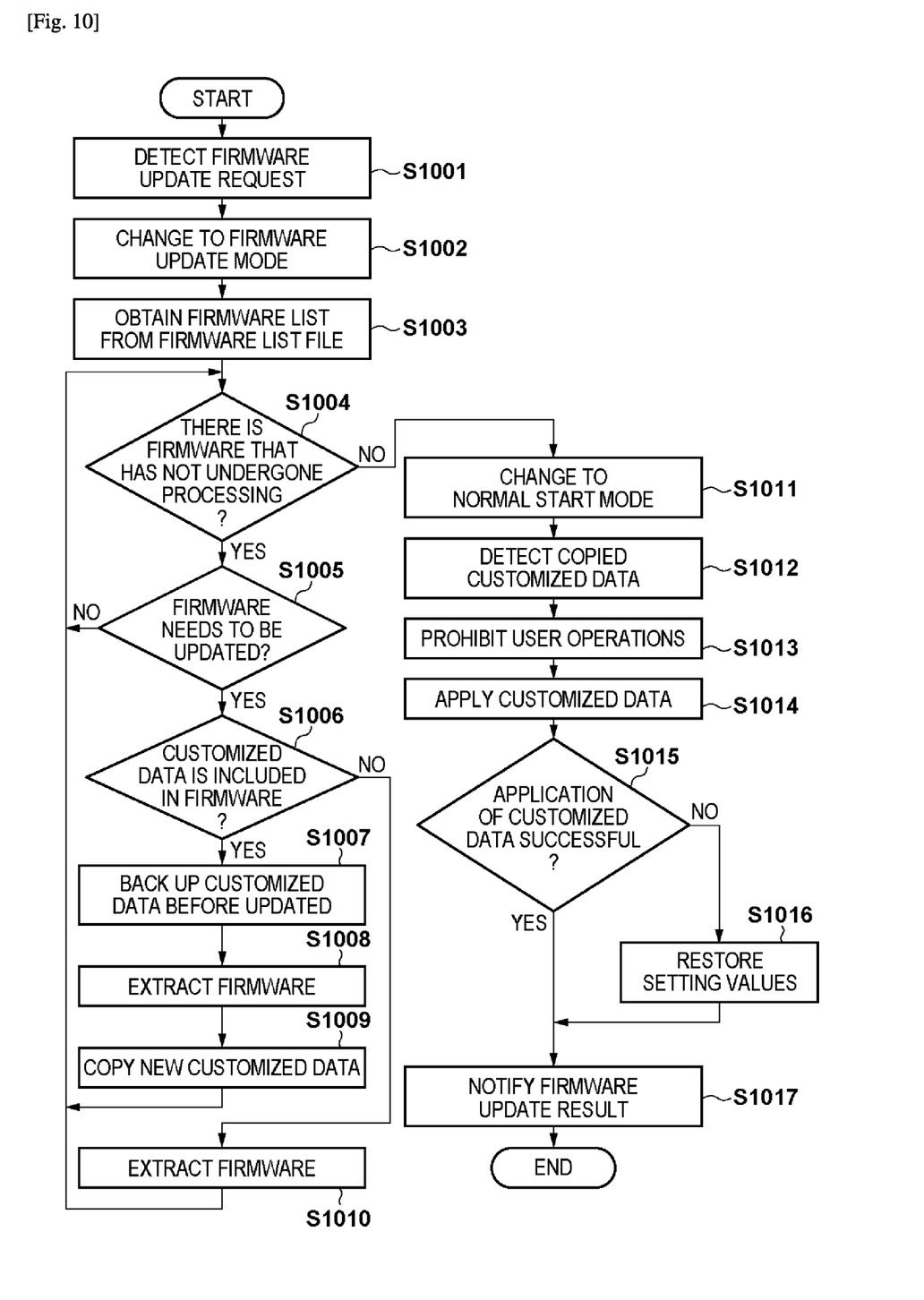
FIG. 10 is a flowchart for updating firmware according to the second embodiment.

FIG. 10 is a flowchart illustrating the flow of firmware update of the image forming apparatus 100. This processing is realized by the CPU 101 of the image forming apparatus 100 reading a program stored in the secondary storage device 104 or the like and executing the program, which thereby operates as a portion of each of the above-described pieces of software. Detailed description of processing steps having the same contents as the processing described with reference to FIG. 7 in the first embodiment, among the processing steps shown in FIG. 10, is omitted.

In step S1001, the firmware update determination unit 205 detects a firmware update request.

In step S1002, the firmware update mode start control unit 903 changes the operation mode of the image forming apparatus 100 to the firmware update mode.

In step S1003, the firmware update determination unit 205 reads the firmware list file 304 that is included in the firmware set 301 to be updated, and obtains a firmware list.

In step S1004, the firmware update determination unit 205 determines whether or not there is, in the firmware list obtained in step S1003, firmware that has not undergone the processing of steps S1005 to S1010. In the case where there is firmware that has not undergone the processing (step S1004: YES), the procedure advances to step S1005, and in the case where there is no firmware that has not undergone the processing (step S1004: NO), the procedure advances to step S1011.

In step S1005, the firmware update determination unit 205 determines whether or not the firmware needs to be updated. The determination here is performed by comparing the version of the firmware stored in the firmware version storage unit 202 to the version of the firmware included in the firmware list obtained in step S1003. In the case where it is determined that the firmware needs to be updated (step S1005: YES), the procedure advances to step S1006, and in the case where it is determined that the firmware does not need to be updated (step S1005: NO), the procedure advances to step S1004.

In step S1006, the customized data application unit 207 determines whether or not customized data is included in the firmware that was determined in step S1005 to be in need of updating. In the case where customized data is included (step S1006: YES), the procedure advances to step S1007, and in the case where customized data is not included (step S1006: NO), the procedure advances to step S1010.

In step S1007, the customized data backup unit 901 backs up the customized data before being updated.

In step S1008, the firmware update unit 206 updates the firmware. The firmware update unit 206 replaces the firmware stored in the firmware storage unit 203 with new firmware, using the firmware set 301, and also updates the firmware version stored in the firmware version storage unit 202.

In step S1009, the customized data application unit 207 copies new customized data extracted in step S1008 in a region that can be referenced even in a normal start mode, within the secondary storage device 104.

In step S1010, the firmware update unit 206 updates the firmware. The firmware update unit 206 replaces the firmware stored in the firmware storage unit 203 with new firmware, using the firmware set 301, and updates the firmware version stored in the firmware version storage unit 202.

In step S1011, the firmware update mode start control unit 903 changes the start mode of the image forming apparatus 100 to the normal start mode. This releases restriction on applying customized data in the image forming apparatus 100.

In step S1012, the customized data application unit 207 detects the customized data copied in step S1009.

In step S1013, the customized data application unit 207 prohibits user operations. There are various methods for prohibiting user operations, but for example, a method for displaying a caution screen on the display 105 and setting a state in which normal operations cannot be performed is conceivable. User operations are prohibited in order to prevent customized data reflection and a user operation from competing with each other.

In step S1014, the customized data application unit 207 applies the customized data.

In step S1015, the customized data application unit 207 determines whether or not the application of the customized data was successful. In the case where the application was successful (step S1015: YES), the procedure advances to step S1017, and in the case where the application fails (step S1015: NO), the procedure advances to step S1016.

In step S1016, the customized data restoration unit 902 restores the customized data backed up in step S1007 and the firmware version of the customized data. Accordingly, the state before update of the customized data failed is entered. Note that in the case where update of the customized data was successful, or where restoration after failure is completed, the customized data that has not been updated and was backed up in step S1007 and the customized data to be updated that was copied in step S1009 may be deleted from the secondary storage device 104.

In step S1017, the firmware update result notification unit 208 notifies a result of updating the firmware. As a notification method, a method for displaying screens such as those described in the first embodiment and shown in FIGS. 6A and 6B can be used.

As described above, according to this embodiment, even in the case where there is a dedicated start mode for updating firmware of an image forming apparatus, it is possible to activate necessary customization settings without a user operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of dis-tributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-239748, filed Dec. 8, 2015, which is hereby incorporated by reference herein in its entirety.

The invention claimed is:

1. An information processing apparatus, comprising:
a memory device that stores a set of instructions; and
at least one processor that executes the set of instructions to:
  obtain a data set of firmware;
  hold, in a holding unit, customized data included in the obtained data set of the firmware, wherein application of the customized data is restricted at a time of performing a firmware update, and the customized data is for a function of firmware;
  perform a firmware update using the obtained data set of the firmware;
  release the restriction on application of the customized data after the firmware is updated; and
  apply the customized data held in the holding unit to firmware provided in the information processing apparatus after the restriction is released.

2. The information processing apparatus according to claim 1, wherein the set of instructions cause the at least one processor to
  compare a version of the customized data included in the obtained data set of the firmware to a version of current customized data applied to the information processing apparatus, and in a case where the customized data included in the obtained data set of the firmware is newer, apply the customized data.

3. The information processing apparatus according to claim 1, wherein the set of instructions cause the at least one processor to
  notify a result of the firmware update and the application of the customized data.

4. The information processing apparatus according to claim 1, wherein the set of instructions cause the at least one processor to
  initialize a setting value of the firmware provided in the information processing apparatus, and after the setting value of the firmware is initialized apply the customized data applied before the initialization.

5. The information processing apparatus according to claim 4, wherein the set of instructions cause the at least one processor to
notify a result of the initialization of the setting value of the firmware.

6. The information processing apparatus according to claim 1, wherein the set of instructions cause the at least one processor to
back up current customized data which is applied to the information processing apparatus, and
in a case where application of the customized data included in the obtained data set of the firmware fails, restore a setting of the firmware using the backed-up customized data.

7. The information processing apparatus according to claim 1, wherein
the case where application of customized data is restricted at a time of performing the firmware update is a case in which the application of the customized data is restricted by an operation mode of the information processing apparatus associated with firmware update.

8. The information processing apparatus according to claim 1, wherein the set of instructions cause the at least one processor to
when applying the customized data held in the holding unit, perform control such that the information processing apparatus does not accept an operation from a user.

9. The information processing apparatus according to claim 1, wherein
a setting value indicated by the customized data is a setting value for activating or deactivating a function of the firmware.

10. A firmware update method for an information processing apparatus which is provided with firmware, the method comprising:
obtaining a data set of firmware;
holding, in a holding unit, customized data included in the obtained data set of the firmware, wherein application of the customized data is restricted at a time of performing a firmware update, and the customized data is for a function of firmware;
performing a firmware update using the obtained data set of the firmware;
releasing the restriction on application of the customized data after the firmware is updated; and
applying the customized data held in the holding unit to firmware provided in the information processing apparatus after the restriction is released.

11. A non-transitory computer readable storage medium storing a program for causing a computer to:
obtain a data set of firmware;
hold, in a holding unit, customized data included in the obtained data set of the firmware, wherein application of the customized data is restricted at a time of performing a firmware update, and the customized data is for a function of firmware;
perform a firmware update using the obtained data set of the firmware;
release the restriction on application of the customized data after the firmware is updated; and
apply the customized data held in the holding unit to firmware provided in the information processing apparatus after the restriction is released.

* * * * *